United States Patent [19] — [11] 3,737,565
Ma et al. — [45] June 5, 1973

[54] SIGNAL DETECTOR FOR A SIGNAL-SEEKING TUNING SYSTEM

[75] Inventors: John Y. Ma, Glenview; Fredrick Zlotnick, Addison, both of Ill.

[73] Assignee: Zenith Radio Corporation, Chicago, Ill.

[22] Filed: Nov. 9, 1970

[21] Appl. No.: 87,664

[52] U.S. Cl. ....................178/5.8
[51] Int. Cl. ....................H04n 5/50
[58] Field of Search ....................178/7.3 R, 5.8, 7.1

[56] References Cited

UNITED STATES PATENTS

| | | | |
|---|---|---|---|
| 3,018,329 | 1/1962 | Skinner et al. | 178/5.8 R |
| 3,045,060 | 7/1962 | Meyer | 178/5.8 R |
| 2,898,400 | 8/1959 | Parmet et al | 178/5.8 R |
| 3,388,215 | 6/1968 | Mayle | 178/5.8 R |
| 3,518,365 | 6/1970 | Chadda et al. | 178/5.8 R |
| 3,553,379 | 1/1971 | Boomgaard | 325/470 |
| 2,910,530 | 10/1959 | Clark | 178/5.8 R |

*Primary Examiner*—Robert L. Griffin
*Assistant Examiner*—John C. Martin
*Attorney*—John J. Pederson and Nicolas A. Camasto

[57] ABSTRACT

A signal detector for a signal-seeking television tuner system which renders the system unresponsive to image signals by detecting the audio subcarrier, video subcarrier, and horizontal sync signals and applying them to a coincidence gate to provide a recognition signal only in response to the reception of a proper RF television signal. Detection of a fourth signal parameter, magnitude, enables the system to reject proper RF television signals too weak for satisfactory viewing.

2 Claims, 2 Drawing Figures

Inventors
John Y. Ma
Fredrick Zlotnick
By R. A. Blackstone
Agent

Inventors
John Y. Ma
Fredrick Zlotnick
By R. A. Blackstone
Agent

SIGNAL DETECTOR FOR A SIGNAL-SEEKING TUNING SYSTEM

BACKGROUND OF THE INVENTION

Signal-seeking tuning systems are well known for their convenience and ease of operation, especially in the field of radio and television receivers. They are commonly used to provide automatic tuning of the next higher or lower frequency of interest in response to the mere momentary contact of a "start" switch. Signals too weak for satisfactory reception are usually skipped over by employing a minimum-threshold circuit in the signal detector portion of the signal-seeking system. Typically, the tuner is caused to scan the RF television frequency spectrum by means of an electric motor which mechanically rotates a variable tuning device such as a variable ("gang") capacitor or a multielement ("turret") device. The scanning motor is initiated by the "start" switch and stopped at or near the frequency of interest by means of a recognition signal which is developed by a signal detector and applied to the motor by means of a feedback control loop. With the advent of voltage-controlled tuners using varactor diodes, a progressively-variable voltage generator has replaced the scanning motor. An automatic frequency control (AFC) circuit may also be employed to precisely tune the receiver to the exact frequency of the received signal and thereafter compensate for small variations in tuner components to maintain the precise tuning.

The recognition signal is typically developed by a signal detector employing a tuned circuit, which resonates at the video intermediate-frequency (IF) subcarrier frequency, and an active device such as a transistor which is coupled to the resonant circuit and develops the recognition signal in the form of a change in collector voltage in response to the resonating of the tuned circuit. Due to the nature of a heterodyne tuner, however, it is possible for the tuner to be mistuned so that the audio subcarrier signal beats with the local oscillator to produce a signal of a frequency corresponding to that of the video IF signal. Consequently, additional means are incorporated in conventional systems to prevent this mistuning. One such method provides for the detection of the horizontal synchronizing (sync) signal frequency in addition to the video IF subcarrier signal in order to develop the recognition signal.

A particular problem in signal-seeking television tuners, however, is that of the signal detector providing a recognition signal when the tuner is tuned to an image signal instead of the desired signal. The image signal and the desired signal correspond to the sum and difference frequency intermodulation products and are symmetrically related to the local oscillator frequency in a heterodyne receiver; therefore the image signal differs in frequency from the desired signal by an amount equal to twice the intermediate frequency of the receiver. Thus, if the oscillator frequency is higher than that of the incoming carrier, the image frequency will be the same amount higher than the oscillator frequency. Although threshold circuitry may be employed to render the system unresponsive to weak image signals, a strong image frequency signal often gets through the selectivity circuits in the tuner and beats with the local oscillator to produce a signal at the receiver's intermediate frequency. Consequently, a conventional signal detector generally cannot distinguish the image signal from the desired signal and therefore will cause the signal-seeking system to tune the receiver to both image signals and desired signals, depending on which it tunes to first. Detecting both the video IF subcarrier and the sync signal does not avoid the problem because the image signal, due to its symmetrical characteristic, cause a recognition signal to be developed which is indistinguishable from that produced by the desired signal.

It is therefore a primary object of the invention to provide a new and improved signal detector for a signal-seeking tuning system.

It is a more specific object of the invention to provide such a new and improved signal detector which is immune to image signals and highly adaptable to a signal-seeking television tuner.

SUMMARY OF THE INVENTION

The invention relates to a television receiver having a signal-seeking tuning system for scanning the RF television frequency spectrum and automatically tuning the receiver to the frequency of a received RF television signal in response to a recognition signal. In accordance with the invention, means for providing the recognition signal only in response to the reception of a proper RF television signal comprise a television tuner responsive to a received RF television signal for developing the video and audio intermediate-frequency subcarrier signals, a first detector coupled to the tuner and responsive to the presence of the audio subcarrier signal for generating a first control effect, and a second detector coupled to the tuner and responsive to the presence of the video subcarrier signal for generating a second control effect. Means are coupled to the tuner and responsive to the video subcarrier signal for deriving a horizontal synchronizing signal, and a third detector coupled to the deriving means and responsive to the horizontal synchronizing signal for generating a third control effect. Coincidence gate means are coupled to all three detectors and responsive only to the presence of all three control effects for producing the recognition signal.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENTS

Figure 1:
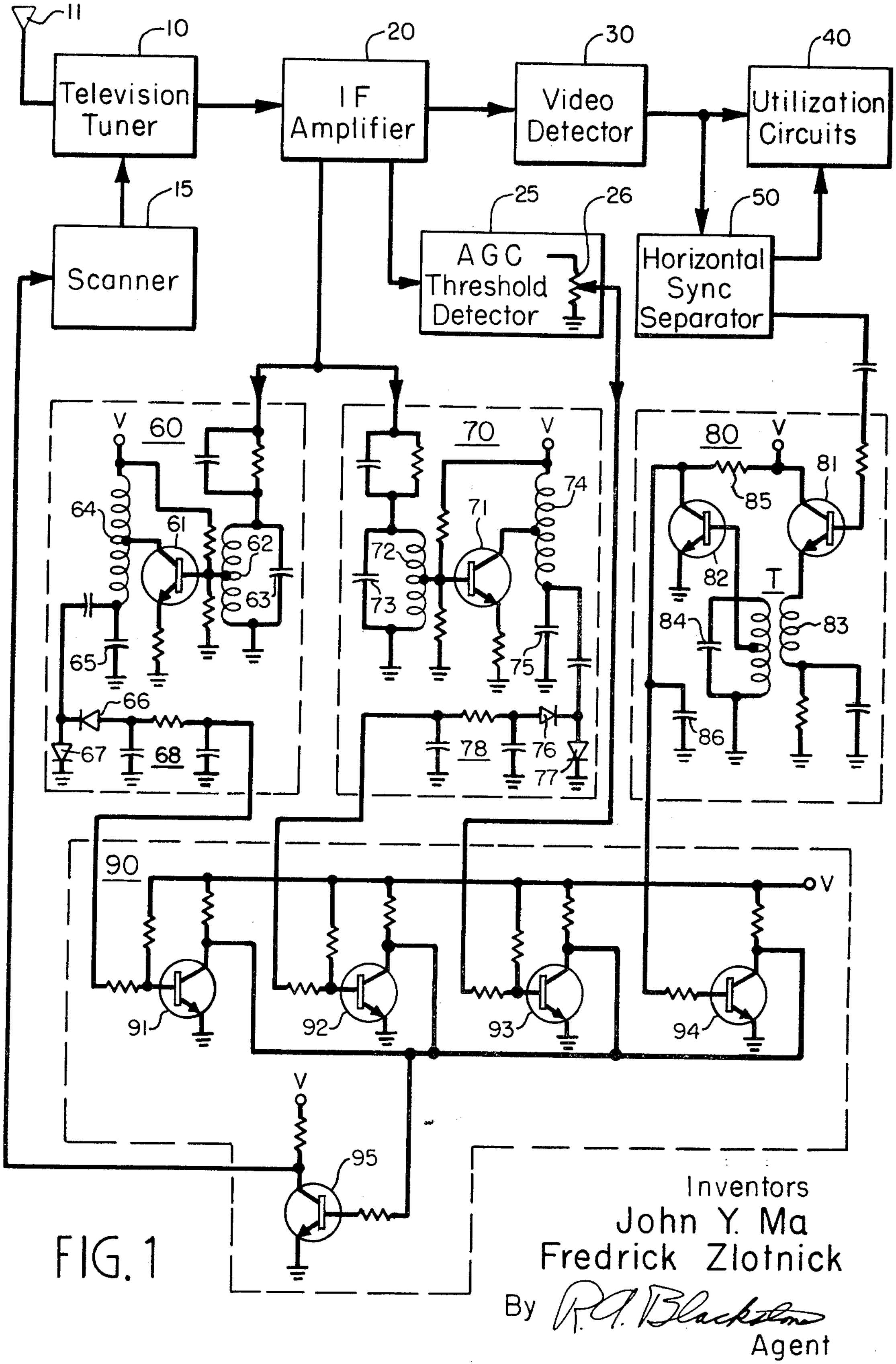
FIG. 1 is a schematic diagram illustrating a preferred embodiment of the invention.

With reference to FIG. 1, a schematic diagram of a preferred embodiment of the invention is shown comprising a television tuner 10 having a suitable antenna 11. Tuner 10 may be either a UHF or VHF tuner, or a combination thereof, and is responsive to the reception of an RF television signal for developing the video intermediate-frequency (IF) subcarrier signal (45.75 megahertz) and the audio IF subcarrier signal (41.25 megahertz). An IF amplifier 20 is coupled to tuner 10 and is responsive to the reception of an RF television signal by tuner 10 for amplifying the video and audio IF signals. A video detector 30 is coupled to IF amplifier 20 and responsive to the video subcarrier signal to develop the video signal including the horizontal synchronizing (sync) information. The remainder of the television receiver circuitry is of no patentable significance to this discussion and is therefore exemplified by utilization circuits 40. Automatic signal seeking is provided by a scanner 15 which causes tuner 10 to scan its frequency band (VHF, UHF, or both) until the receiver is tuned to a suitable signal whereupon scanner 15 is stopped in response to a recognition signal provided by the signal detector discussed immediately below.

In accordance with the invention, an improved signal detector for providing a recognition signal in response to the reception of a suitable signal by tuner 10 comprises an audio IF subcarrier detector 60, a video IF subcarrier detector 70, a horizontal sync detector 80, and a coincidence gate 90. Detectors 60 and 70 are each coupled to IF amplifier 20 and responsive to the video and audio IF subcarrier signals therein for generating first and second control effects, respectively. Where the magnitudes of the IF signals developed by the tuner are sufficient, detectors 60 and 70 may be directly coupled to tuner 10. Video detector 30 and horizontal sync separator 50 provide means coupled to tuner 10, by way of IF amplifier 20, which are responsive to the video subcarrier signal for deriving a horizontal synchronizing (sync) signal. Sync detector 80 is coupled to sync separator 50 and is responsive to the presence of the sync information (or harmonics thereof) therein for generating a third control effect. A coincidence gate 90 is coupled to all three detectors (60, 70, and 80) and is responsive only to the presence of all three control effects generated thereby for producing a recognition signal. The recognition signal is applied to scanner 15 to stop the scanner, and therefore tuner 10, at the frequency of the received television signal. By detecting both the audio and video subcarrier signals, in addition to the sync signal, only a properly received television signal is recognized by the signal-seeking system. Should the scanner tune the receiver to an image signal, video subcarrier detector 70 and audio subcarrier detector 60 will both generate a control effect. However, as discussed below in greater detail, because the video information is at the audio IF subcarrier frequency, no sync signal is derived; hence, the required third control effect is not generated and the scanner does not stop the tuner at the frequency of the image signal. Consequently, the scanner stops the tuner only when the tuner is precisely tuned to the exact carrier frequency of a proper RF television signal.

Audio IF subcarrier signal detector 60 comprises a transistor 61 having a tuned circuit consisting of the parallel combination of a capacitor 63 and a tapped inductor 62 coupled to its base. The collector of transistor 61 is tuned by the series combination of a tapped inductor 64 and a capacitor 65. Both tuned circuits may be made to resonate at the audio IF subcarrier frequency of 41.25 megahertz. A half-wave rectifier, consisting of diodes 66 and 67, and a filtering network 68, consisting of two capacitors and a resistor, provide a control effect in the form of a negative DC voltage whenever a signal of the resonant frequency is applied to the base circuit of transistor 61.

Video IF subcarrier signal detector 70 is constructed much the same as audio subcarrier detector 60 except that it is tuned to the video subcarrier frequency (45.75 megahertz). Detector 70 also generates a control effect in the form of negative DC voltage whenever a signal having a frequency equal to the resonant frequency of the detector is applied to the base circuit of transistor 71.

Employing both an audio subcarrier detector and a video subcarrier detector in a signal-seeking system avoids the mistuning problem of having the scanning mechanism stop the tuner slightly above or slightly below the frequency of the television carrier signal. Such mistuning results when employing only one of these two detectors because, due to the operation of a heterodyne tuner, it is possible for the audio subcarrier signal to beat with the local oscillator to produce the video intermediate-frequency subcarrier frequency, and vice versa. Consequently, employing both detectors insures that the tuner is tuned to the exact frequency of the television signal carrier before the scanner is caused to stop the tuner at that frequency. Unfortunately, employing two such detectors does not provide a system which can distinguish the desired signal from the image thereof.

In accordance with the invention, the signal detector further includes a sync detector 80 coupled to IF amplifier 20 by means of video detector 30 and horizontal sync separator 50, and responsive to the presence of the sync information in the video signal, for generating a third control effect in the form of a negative DC voltage. This insures that all image signals will be rejected because a sync signal is detected by detector 80 only when video information is detected by video detector 30, which is when the received video information is at the video IF subcarrier frequency. In other words, when the audio subcarrier signal beats with the local oscillator to produce a signal of a frequency corresponding to that of the video intermediate-frequency subcarrier signal and vice versa, as is the case when the tuner is tuned to an image signal, no video information is detected by video detector 30 and, therefore, nothing is detected by sync detector 80. Hence, even though both audio subcarrier detector 60 and video subcarrier detector 70 generate a control effect in response to the reception of an image signal, sync detector 80 does not generate a control effect, thereby precluding the signal-seeking system from tuning to an image signal.

Sync detector 80 comprises transistors 81 and 82 connected by a transformer T having a tapped secondary winding connected in parallel with capacitor 84, and having a resonant frequency of 47.25 kilohertz (the third harmonic of the sync frequency of 15.75 kilohertz). Transistor 81 is biased to operate in a class C mode to develop a series of unidirectional pulses which are applied to transistor 82 by means of transformer 83. A relatively long time constant is established by resistor 85 and capacitor 86 so that, as transistor 82 is repeatedly turned on by the unidirectional pulses from transistor 81, a negative collector voltage is established for transistor 82, to thereby generate a control effect for application to gate 90.

Coincidence gate 90 is coupled to detectors 60, 70, and 80 and may be made responsive only to the presence of all three control effects for producing a recognition signal for causing scanner 15 to stop tuner 10 at the frequency of a received signal. It has been found preferable, however, to provide means responsive to the magnitude of the received RF television signal for precluding the production of the recognition signal, thereby causing the signal-seeking system to avoid tuning to signals too weak for satisfactory television viewing. One way to accomplish this, in accordance with a further aspect of the invention, is to include a fourth input for gate 90 and an AGC threshold detector 25 to sample the AGC voltage at the input circuit IF amplifier 20 and develop a fourth control effect for application to gate 90. A potentiometer 26 is included in threshold detector for enabling selection of the desired threshold rejection level. Detector 25 may also be used to provide the correct polarity for the DC signal thereby applied to gate 90.

Any suitable coincidence gate may be used for gate 90. The coincidence gate shown is a positive-logic NOR gate consisting of four input transistors, 91–94, and an output transistor 95 having its base connected to the collectors of the input transistors. Transistors 91–94 are each biased such that they are normally turned on; hence, transistor 95 is normally turned off. Only when all four input transistors have a negative voltage applied to their bases will the voltage applied to the base of transistor 95 be sufficient to turn it on and thereby produce an output signal which is applied to scanner 15. Thus, coincidence gate 90 is responsive only to the presence of the control effects generated by detectors 60, 70, and 80 and AGC threshold detector 25 for producing a recognition signal, whereby the signal-seeking system is caused to reject all image signals and tune in a received station only when the tuner is properly tuned thereto.

Figure 2:
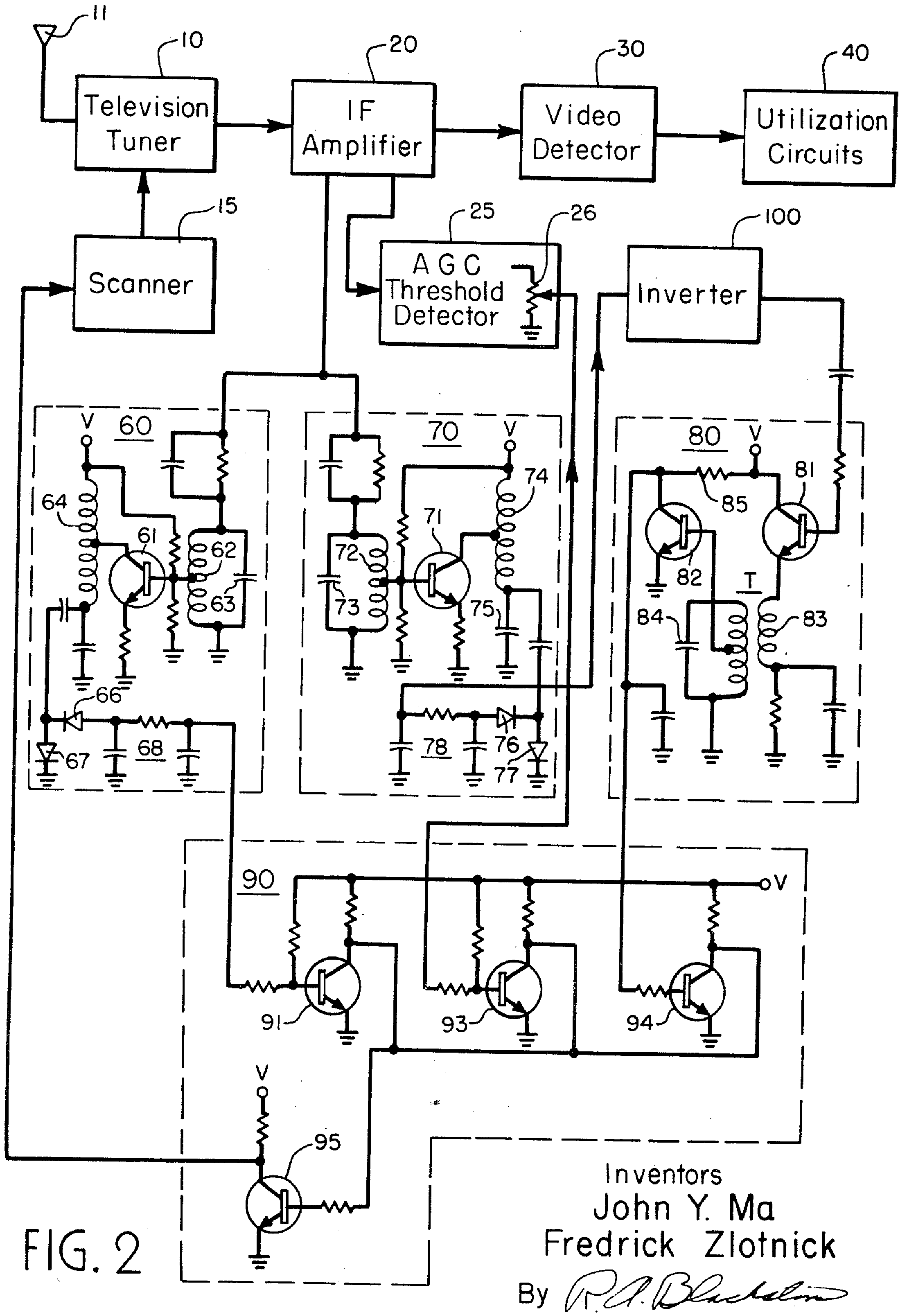
FIG. 2 is a schematic diagram of an alternative embodiment of the invention.

An alternative embodiment of the invention is shown in FIG. 2 wherein the output of video subcarrier detector 70, which contains horizontal sync information when the receiver is properly tuned to a television signal, is coupled to sync detector 80 by means of an inverter 100. Inverter 100 is used to provide the proper polarity for the sync signal and also to provide any necessary amplification thereof. With this arrangement, coincidence gate 90 need only have three inputs because detector 80 will generate a control effect in the form of a negative DC voltage only when detector 70 detects the video IF subcarrier signal and detector 80 detects the horizontal sync signal therein.

Thus there has been shown a new and improved signal detector for a television receiver having a signal-seeking tuner. The detector is immune to image signals and thereby causes the system to tune to the exact frequency of a received RF television signal.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. In a television receiver having a signal-seeking tuning system for scanning the RF television frequency spectrum and automatically tuning said receiver to the frequency of a received RF television signal in response to a recognition signal, means for providing said recognition signal only in response to the reception of a proper RF television signal, comprising:

a television tuner responsive to a received RF television signal for developing video and audio intermediate-frequency subcarrier signals;

a first detector coupled to said tuner and including a circuit resonant at the frequency of said audio subcarrier signal for generating a first control effect;

a second detector coupled to said tuner and including a circuit resonant at the frequency of said video subcarrier signal for generating a second control effect;

means coupled to said tuner and responsive to said video subcarrier signal for deriving a horizontal synchronizing signal;

a third detector coupled to said deriving means and responsive to said horizontal synchronizing signal for generating a third control effect;

and coincidence gate means coupled to all three said detectors and responsive only to the presence of all three of said control effects for producing said recognition signal.

2. In a television receiver having a signal-seeking tuning system for scanning the RF television frequency spectrum and automatically tuning said receiver to the frequency of a received RF television signal in response to a recognition signal, means for providing said recognition signal only in response to the reception of a proper RF television signal, comprising:

a television tuner responsive to a received RF television signal for developing video and audio intermediate-frequency subcarrier signals;

a first detector coupled to said tuner and including a circuit resonant at the frequency of said audio subcarrier signal for generating a first control effect;

a second detector coupled to said tuner and including a circuit resonant at the frequency of said video subcarrier signal for generating a horizontal synchronizing signal;

a third detector coupled to said second detector and responsive to said horizontal synchronizing signal for generating a second control effect;

and coincidence gate means coupled to said first and third detectors and responsive only to the presence of both said control effects for producing said recognition signal.

* * * * *